Feb. 20, 1923.
R. A. BOYD
1,446,114
COMBINED FRUIT SQUEEZER AND ICE SHAVER AND MOLD
Filed Jan. 29, 1921
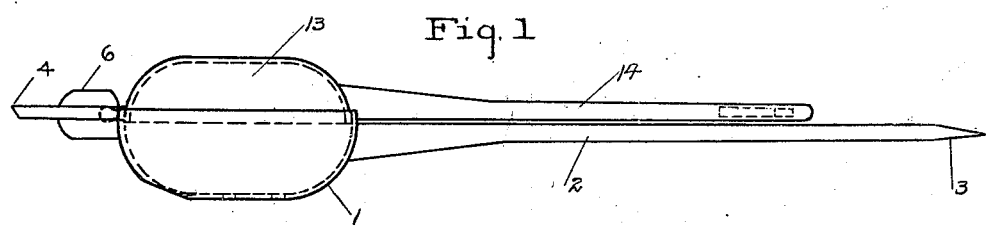
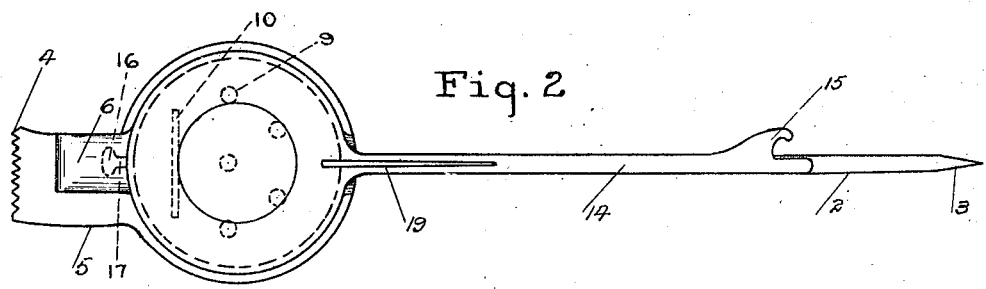
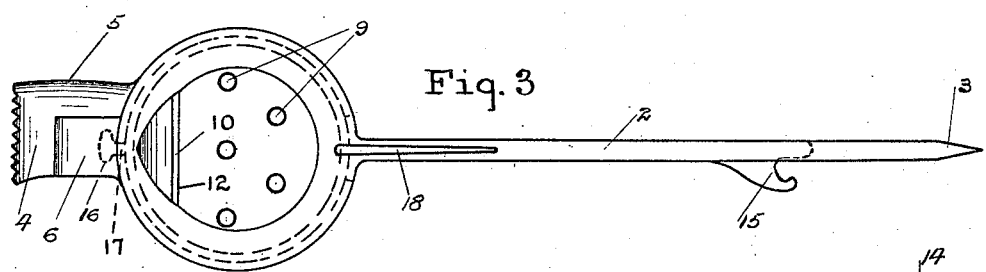
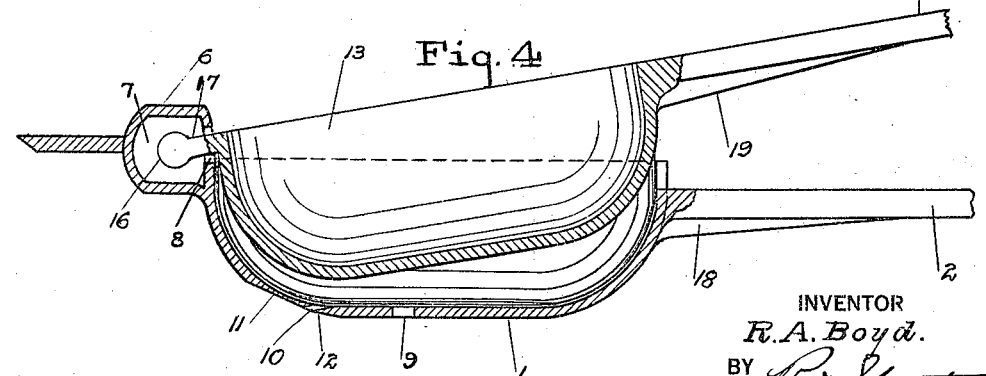
INVENTOR
R. A. Boyd.
BY
ATTORNEY Patented Feb. 20, 1923.

1,446,114

UNITED STATES PATENT OFFICE.

ROBERT A. BOYD, OF BIRMINGHAM, ALABAMA.

COMBINED FRUIT SQUEEZER AND ICE SHAVER AND MOLD.

Application filed January 29, 1921. Serial No. 441,031.

*To all whom it may concern:*

Be it known that I, ROBERT A. BOYD, a citizen of the United States of America, residing at Birmingham, in the county of Jefferson and State of Alabama, have invented certain new and useful Improvements in Combined Fruit Squeezers and Ice Shavers and Molds, of which the following is a specification.

This invention relates to a combination implement for household and soda fountain use which is capable of squeezing lemons or oranges, shaving ice to form snowball molds, and the parts of which are separable to form a ladle suitable for syrup and which may be additionally equipped with means for cutting oranges or lemons and opening bottles.

One distinctive feature of my invention is the provision of the lower or socket member of the lemon or orange squeezer with a shaving lip in its bowl and with an ice pick at one end and an ice scraping and fruit cutting blade at its other end.

A further object is to form the upper or compression member of the squeezer as a ladle having a connection to the bowl member by which it is adapted to be readily detached for use as a ladle or to co-operate with the bowl member either as a squeezer or as a cup to enclose a ball of shaved ice. If desired, this compressed member may be provided with a bottle opener.

My invention in its preferred embodiment only will be best understood by reference to the accompanying drawings, in which:—

Figure 1 is a side view of the combination tool with the compression member or ladle inverted for use as an ice shaver to form snowballs;

Figs. 2 and 3 are top and bottom views, respectively, of the device; and

Fig. 4 is an enlarged sectional view showing the ladle in position for use as a fruit squeezer.

Similar reference numerals refer to similar parts throughout the drawings.

The lower member of the appliance comprises a bowl portion 1 having a handle 2 terminating in a pointed end forming an ice pick 3 and having at its other end a serrated ice scraping blade 4 sharpened along one side edge to form a fruit cutting knife blade 5. This end carries an integral enlargement 6 in which is formed a chamber 7 provided with a vertically elongated opening 8 in the adjacent side face of the bowl. The bottom of the bowl is provided with a series of openings 9 through which the expressed fruit juice can escape and near its forward end is provided with a transverse slot 10 opening through the cutaway face 11 of the bowl which forms a shaving edge 12 at the base of the slot 10.

The upper member comprises a ladle 13 having a handle 14 provided with a bottle-cap opener 15. The ladle is also provided with a button or head 16 which is connected by a shank 17 to the ladle. The head is of greater length than the width of the slot 8 but is slightly less in length than the length of the slot 8 and is free to turn or be rotated in the chamber 7. The shank 17 will turn in the slot 8. The handles 2 and 14 may be provided with suitable reinforcing ribs 18 and 19 if desired.

In operation, as a fruit squeezer, the handle 14 is grasped and the button 16 is turned to bring its long axis into parallelism with the long axis of the slot 8 and it can then be inserted through the slot 8, whereupon its head is turned 90° to present the ladle in position to enter the bowl 1. The device with the parts in this position (see Fig. 4) forms a standard type of orange and lemon squeezer, the members being adapted to open up and compress the fruit in the manner well understood in this art. When it is desired to form shaved balls of ice, the ladle 13 is turned about the pin shank 17 as an axis without removing the button from the chamber 7 and thereupon assumes the position in Fig. 1, in which case by pushing the shaving edge 12 across the ice the shaved ice will enter through slot 10 and fill the cup, formed by the members 1 and 13, with shaved ice.

By detaching the ladle 13 it can be used separately as a ladle for handling fruit juices or for any other purpose, and the ice scraping blade 4 can be used with or without detaching the two members, and the same is true of the knife 5 and of the ice pick 3. The bottle opener will work without disconnecting the parts, and the tool as a whole forms an appliance of wide usefulness in the home and at the soda fountains while being comparatively inexpensive.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a combined fruit squeezer and ice shaver, one member provided with a bowl having apertures adapted for the passage of shaved ice and fruit juices, and a reversible member hingedly connected to the bowl member and provided on one face with a plunger adapted to co-operate with the bowl as a fruit squeezer and when inverted adapted to co-operate with the bowl to form a closure to receive shaved ice.

2. In a combined fruit squeezer and ice shaver, one member provided with a bowl having a shaving edge and apertures for the passage of shaved ice and fruit juices, and a reversible member hingedly connected to the bowl member and provided with a ladle adapted to co-operate with the bowl to form in one position, a fruit squeezer and, in an inverted position, a bowl for shaved ice.

3. In a device of the character described, one member comprising a perforated bowl with a handle on one side, a socket on the opposite side, means on the bowl to shave and direct ice thereinto, and a second member having a ladle with a handle on one side and a button on the other, the latter being adapted to detachably and reversibly interlock said socket on the first-mentioned member, substantially as described.

4. In a device of the character described, a bowl having a perforated bottom and an ice shaving edge adapted to direct shaved ice thereinto through a perforation, a handle on one side of the bowl and a socket having an oblong opening on the other side, and a second member comprising a ladle with a handle on one side and an oblong button on the other, said button being adapted to be engaged in said socket to detachably and reversibly hinge said members together.

5. In a device of the character described, a perforated bowl having a handle on one side and a projection on the opposite side formed with an oblong socket opening towards the bowl, and another member provided with a ladle-like portion interposed between a handle on one side and an oblong button on the other, said button being adapted to detachably and reversibly engage in said socket to hinge said members, substantially as described.

In testimony whereof I affix my signature.

ROBERT A. BOYD.

Witness:
NOMIE WELSH.